US006832401B2

(12) United States Patent
Setzer

(10) Patent No.: US 6,832,401 B2
(45) Date of Patent: Dec. 21, 2004

(54) SPRING SUPPORT SYSTEM

(75) Inventor: Dennis A. Setzer, Conover, NC (US)

(73) Assignee: Hickory Springs Manufacturing Company, Hickory, NC (US)

(*) Notice: Subject to any disclaimer, the term of this patent is extended or adjusted under 35 U.S.C. 154(b) by 34 days.

(21) Appl. No.: 10/123,606

(22) Filed: Apr. 16, 2002

(65) Prior Publication Data

US 2003/0192124 A1 Oct. 16, 2003

(51) Int. Cl.[7] .............................................. A47C 16/00
(52) U.S. Cl. ............................... 5/655.7; 5/716; 5/717; 267/94
(58) Field of Search ......................... 5/230, 235, 248, 5/256, 257, 716, 717, 721, 655.7; 267/94, 95, 103

(56) References Cited

U.S. PATENT DOCUMENTS

| | | | | |
|---|---|---|---|---|
| 316,444 A | * | 4/1885 | Burr | ............................... 5/230 |
| 416,679 A | * | 12/1889 | Jones | ............................. 5/230 |
| 1,087,247 A | | 2/1914 | Leistner | |
| 1,529,298 A | * | 3/1925 | Brian | .................... 297/452.42 |
| 1,725,935 A | | 8/1929 | Roeske | |
| 1,846,981 A | | 2/1932 | Struss | |
| 1,982,030 A | | 11/1934 | Stadtler | ........................ 5/264 |
| 2,026,843 A | | 1/1936 | Meutsch | ................. 155/179 C |
| 2,100,393 A | | 11/1937 | Hamilton | ........................ 5/230 |
| 2,124,720 A | | 7/1938 | Van Hove | ........................ 5/235 |
| 2,248,023 A | | 7/1941 | Goldberg | ........................ 5/230 |
| 3,067,992 A | | 11/1962 | Bond | .......................... 267/100 |
| 3,259,924 A | * | 7/1966 | Inman | ............................ 5/716 |
| 5,142,718 A | * | 9/1992 | Anderson et al. | ............... 5/497 |
| 5,570,874 A | * | 11/1996 | Tornero | ........................ 267/95 |
| 5,603,132 A | * | 2/1997 | Zafiroglu | ........................ 5/497 |
| 5,700,060 A | | 12/1997 | Bullard et al. | .......... 297/452.63 |
| 5,761,784 A | | 6/1998 | Ogle et al. | .................... 29/91.1 |
| 5,894,664 A | | 4/1999 | Bullard et al. | ........... 29/896.92 |
| 5,924,681 A | | 7/1999 | Bullard | ......................... 267/89 |
| 5,924,682 A | | 7/1999 | Bullard | ........................ 267/103 |
| 5,957,438 A | | 9/1999 | Workman et al. | .............. 267/90 |
| 6,036,181 A | | 3/2000 | Workman | ..................... 267/90 |
| 6,056,278 A | * | 5/2000 | Bullard et al. | ................. 267/91 |
| 6,085,397 A | | 7/2000 | Workman et al. | ............ 29/91.1 |
| 6,116,694 A | | 9/2000 | Bullard | ................... 297/452.52 |
| 6,143,122 A | | 11/2000 | Mossbeck et al. | ........... 156/291 |
| 6,186,483 B1 | | 2/2001 | Bullard | ......................... 267/89 |
| 6,196,156 B1 | * | 3/2001 | Denesuk et al. | ............ 119/28.5 |
| 6,295,673 B1 | | 10/2001 | Mossbeck | ................... 5/655.8 |

* cited by examiner

Primary Examiner—Heather Shackelford
Assistant Examiner—Lisa M. Saldano
(74) Attorney, Agent, or Firm—Womble Carlyle Sandridge & Rice, PLLC; C. Robert Rhodes; Cray H. Popalis

(57) ABSTRACT

An improved spring support system is disclosed for use in seating or bedding. The invention includes an outer frame having opposed top edges. A plurality of vertically resilient members having top ends and lower ends are fixedly disposed within the outer frame in a plurality of rows and columns. An elastic top sheet is stretched between the opposed top edges of the frame and over the top ends of the vertically resilient members. The resilient top sheet and vertically resilient members cooperate to provide a resilient support surface for supporting a person seated or reclined on the support surface.

24 Claims, 7 Drawing Sheets

SPRING SUPPORT SYSTEM

BACKGROUND OF THE INVENTION

1) Field of the Invention

The invention relates to spring support assemblies, and more specifically to an improved spring support system for use in chairs, sofas, bedding, car seats, and the like.

2) Description of the Prior Art

Coil spring systems have long been used in seating and bedding to provide a resilient, load-bearing support surface. Such spring systems typically include coil springs variously mounted in a frame or support structure. The springs are supported in the frame or structure by slats, bars, wires, straps, or the like which extend across an open bottom of the frame structure. The coil springs are typically stapled, clipped, crimped, or clinched to the underlying support. Typically, the springs are arranged in rows and columns within the supporting structure. The top ends of the springs are typically interconnected to maintain the spring alignment and spacing, and to assist in distributing applied loads between the springs. The top ends of the springs are often interconnected or "unitized" by a lattice of interwoven straps or by pre-made grids of wire or the like. Alternatively, the tops of the springs may be tied together with a network of twine or wire. Where twine is used, eight-way, hand-tied springs are common, particularly in finer furniture. An example of such eight-way hand-tied springs is illustrated in FIG.6 of U.S. Pat. No. 5,924,682. Though such hand-tied springs provide an effective and comfortable spring support system, the process of hand-tying springs with twine is labor-intensive, and therefore adds significant cost to a spring support system's production.

One known lower-cost alternative to coil spring suspension systems is a resilient support including so-called "sinuous" spring assemblies. Sinuous springs are serpentine-shaped lengths of wire. Such a suspension system is described in U.S. Pat. No. 6,116,694. In such an arrangement, sinuous springs are suspended across an open top of a frame. An advantage of such systems is that the springs do not need to be interconnected with each other or otherwise supported in the frame. Unfortunately, such lower-cost systems do not provide the comfort, "feel," or durability of more costly coil-spring systems.

In another known alternative to coil spring systems, a resilient sheet of stretchable webbing material is tautly stretched across an open support frame without springs. The stretchable material deflects when loads are applied and stretches to conform in shape to an applied load. The material elastically returns to its original shape when loads are removed. Such systems are also much less costly to produce than traditional coil spring systems, but may provide a support surface which is too "spongy", i.e. which lacks adequate stiffness or support.

Therefore, there is a need for an improved spring support system which includes the comfort and "feel" of expensive coil spring systems, but which is less-costly to produce.

SUMMARY OF THE INVENTION

The invention provides an improved spring support system and apparatus for use in articles of furniture such as chairs and sofas, bedding, car seats or the like. The improved spring suspension system eliminates the need for the expensive eight-way hand-tied spring system and provides a resilient, cushioned surface for supporting persons seated or reclined on the surface. The improved spring support system includes a resilient sheet stretched over a plurality of springs to provide a resiliently responsive support surface suitable for use in chairs, sofas, bedding or the like. The resilient support provided by the stretchable top sheet supplements the support provided by the underlying springs, thereby reducing the number of springs (by about a third) required in a spring support system. The improved system is dynamically responsive to changes or shifts in applied loads, and provides an extremely comfortable resilient support surface. The spring support system may be integrated into an article of furniture and may be padded, covered, or upholstered to provide a finished seating or reclining surface. The spring support apparatus may also include an outer frame which is designed to be inserted into and affixed to a receiving portion of furniture frame or the like.

An apparatus according to the present invention includes an outer frame having an open bottom, an open top, a front, and a back. The front and back include opposed top edges. A lower spring support means is attached to the frame and spans the open bottom of the frame. A plurality of vertically-oriented springs are disposed in the frame. Bottom ends of the springs are affixed to the lower spring support means, and the springs are arranged in an array of rows and columns within the outer frame. A resilient top sheet is stretched (about 50%) across the open top of the frame between the opposed top edges of the front and back. The top sheet extends over the top ends of the springs, and each of the springs is at least partially vertically compressed between the lower spring support means and the top sheet, thereby preloading the springs.

Preferably, the resilient top sheet has a stretch factor of about 100. In other words, a preferred top sheet is stretchable from an unstretched width to a fully-stretched width, where the fully-stretched width is about twice as wide as the unstretched width. The top sheet is affixed to the frame such that the top sheet is stretched to about fifty percent of its fully stretched width, thereby providing a tautly stretched support surface. The top sheet may be stretched more or less on the frame depending on the desired degree of support and stiffness.

A preferred material for the top sheet is a woven or knit material comprising highly elastic yarns in the warp direction. The elastic warp yarns are formed by a resilient core wrapped by at least one substantially inelastic cover yarn. The warp yarns are interwoven with a plurality of substantially inelastic weft yarns. The woven yarns are preferably covered by a resilient outer coating such as latex which is at least partially impregnated between the interwoven yarns. This preferred material is mounted on the frame such that the top sheet is stretched in a direction which is substantially parallel to the elastic warp yarns. The cores of the warp yarns may be comprised of synthetic or natural rubber, the wrap or cover yarn is cotton, nylon, polyester, or the like, and the weft yarns are preferably polypropylene, polyester, or the like.

In a preferred arrangement, the outer frame is substantially rectangular. The lower spring support is rather conventional and preferably includes a plurality of substantially inelastic support straps which are at least partially interwoven in crossed, spaced arrangement, and extend across the open bottom of the outer frame. Ends of the straps are affixed to the frame by staples or the like. Bottom ends of the springs are affixed to the support straps at points of overlapping intersection between the interwoven straps. The lower spring support means may further include a plurality of strap reinforcement bands, wherein the reinforcement bands are affixed to the outer frame such that at least one reinforcement band underlies each of the spring support straps spanning the open bottom of the frame. Preferably, the spring support straps are constructed of woven material such as polypropylene, and the reinforcement bands are metal such as steel.

The springs are any type of resilient members which provide resilient vertical support under the top sheet. Preferably, the springs are coil springs including bottom turns. When the lower spring support means comprises interwoven straps, the bottom turns of the springs may be captured in fixed arrangement between overlapping straps. In this arrangement, a first support strap extends under the bottom turn of each spring, and a corresponding intersecting support strap extends over the bottom turn of each spring and under the first support strap. This method of attachment eliminates the need for a separate attachment means such as clips or the like between the bottom ends of the springs and the lower spring support means.

Preferably, a top turn of each coil spring is affixed to the overlying top sheet. One or more metal clips such as hog rings or the like may be used for this purpose. By affixing the top ends of the coil springs to the top sheet in this way, the springs are secured and prevented from moving laterally out of alignment in the apparatus. The clips also ensure that the springs cannot slip along the underside of the top sheet or move away from applied loads, so that loads applied to the top sheet can be effectively transmitted between adjacent springs through the top sheet.

The outer frame is preferably constructed of wood. The side edges of the sheet may be affixed to the opposed top edges of the outer frame by a plurality of staples or other suitable fasteners. The partially compressed springs may have a partially compressed spring height which is taller than the sides of the frame, such that the tautly stretched top sheet defines a substantially arcuate cover over the top ends of the springs.

The invention also includes a seat including an improved spring support system. The seat includes a frame portion comprising opposed front and rear panels and opposed end panels defining a frame interior. The front and rear panels include top and bottom edges and a first height, and the end panels have upper and lower edges and a second height, wherein the bottom edges and lower edges are substantially coplanar and define a bottom support plane. A plurality of coil springs are disposed within the frame, and include top ends and bottom ends. The springs have an uncompressed spring height which is greater than the first height of the frame side panels, and are vertically oriented in at least two rows to form a spaced array of springs within the frame interior. A lower spring support means is provided for laterally fixing and vertically supporting the bottom ends of the coil springs at points proximate the bottom support plane of the frame portion. A resilient top sheet includes opposed side edges which are affixed to the opposed top edges of the front and rear panels, respectively, such that the sheet is tautly stretched in a warp direction between the top edges and is stretched over the top ends of springs. Each of the springs is at least partially vertically compressed between the lower spring support means and the top sheet, thereby preloading the springs.

In a preferred arrangement, the seat includes a frame portion which is substantially rectangular. As described above, the spring support means may include a plurality of spring support straps which are interwoven in spaced arrangement and tautly stretched across the bottom of the frame portion. The coil springs may be affixed to the support straps at points of overlapping intersection of the interwoven straps. Reinforcement bands may be provided under the support straps to provide additional support under the springs. Bottom turns of the springs may be engaged on the interwoven straps to secure the springs in place, and top turns of the coils are preferably attached to the top sheet by a series of metal clips. The top sheet is preferably constructed of a highly-stretchable, woven elastic material as summarized above.

DETAILED DESCRIPTION

Figure 1:
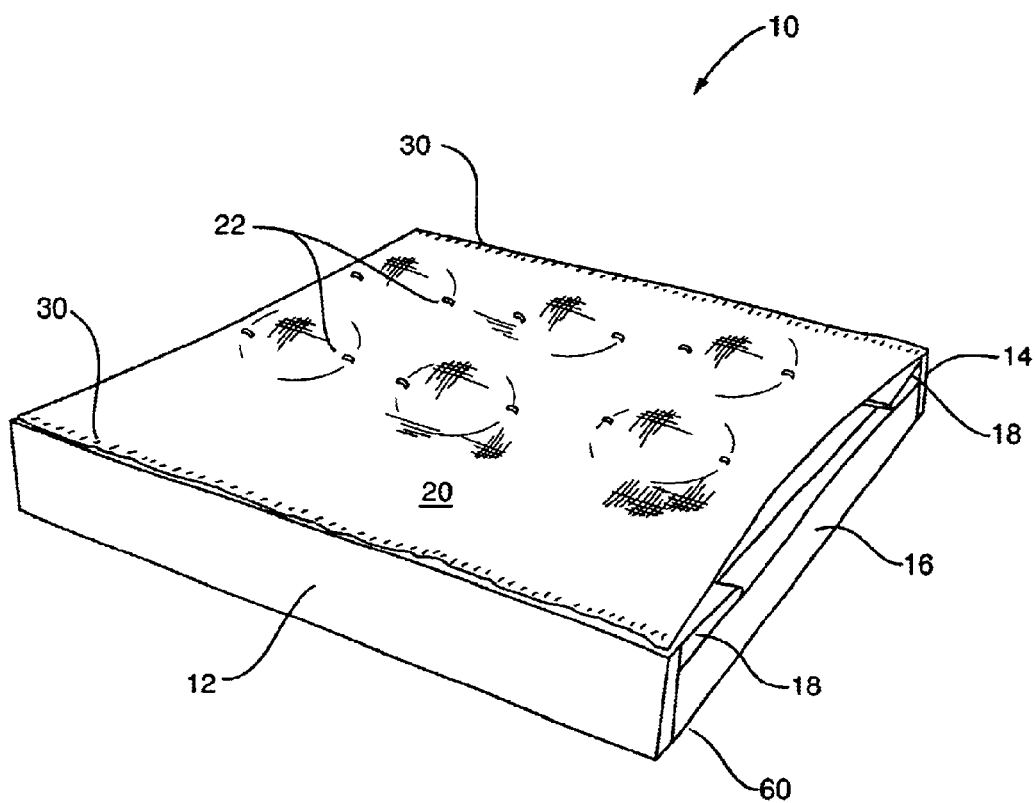
FIG. 1 is a perspective view showing the top of a spring support assembly according to the present invention.
Figure 2:
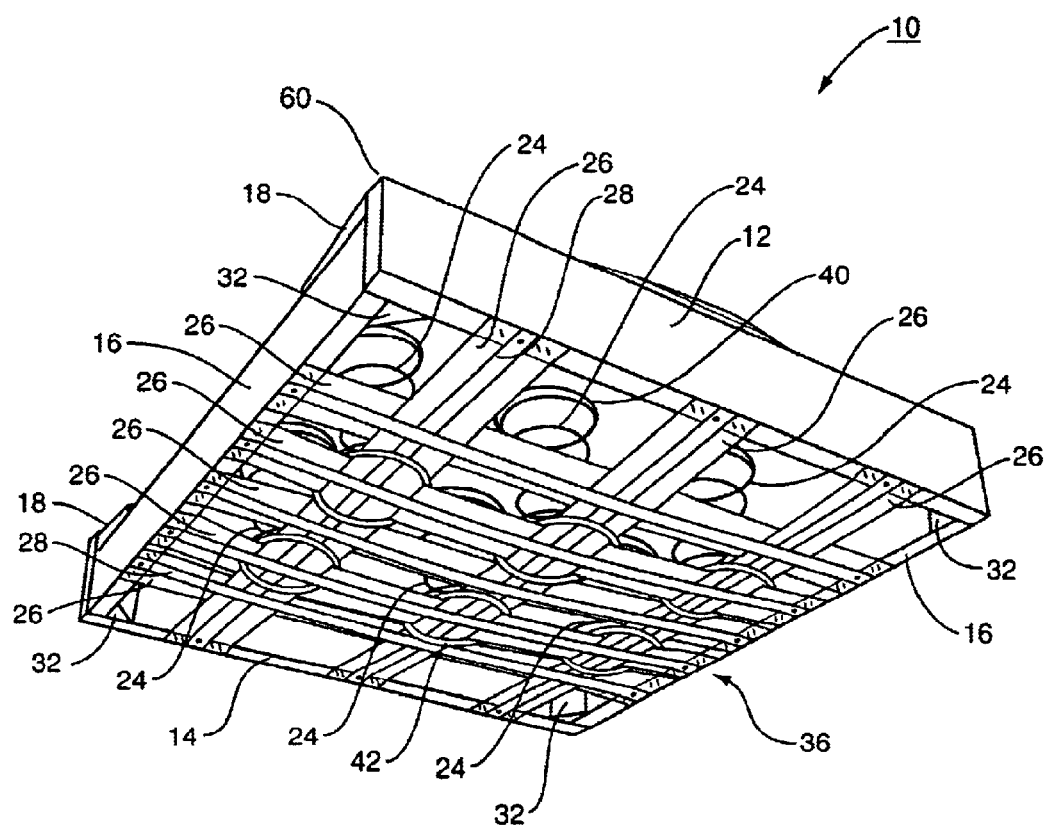
FIG. 2 is a perspective view of the bottom of the spring support assembly shown in FIG. 1.

Referring now to the drawings in general and FIG. 1 in particular, it will be understood that the illustrations are for the purpose of describing a preferred embodiment of the invention and are not intended to limit the invention thereto. FIGS. 1 and 2 are perspective views of a spring support assembly 10 according to the present invention. The spring support assembly 10 includes a substantially box-shaped frame 60 carrying an arrangement of springs 24 suitable for use in a seat such as a chair. As will be apparent to those of ordinary skill in the art after a reading of the following description, the length and/or width of the assembly can be varied to provide a spring support assembly for use in a seat of any size, including a car seat. For example, a longer version of the illustrated embodiment can be used as a spring support in a sofa or the like. Still further, a longer and wider version can be used as a box spring for a bed. Thus, the present invention can be adapted for use in virtually any article requiring a resilient and responsive suspension system.

Figure 3:
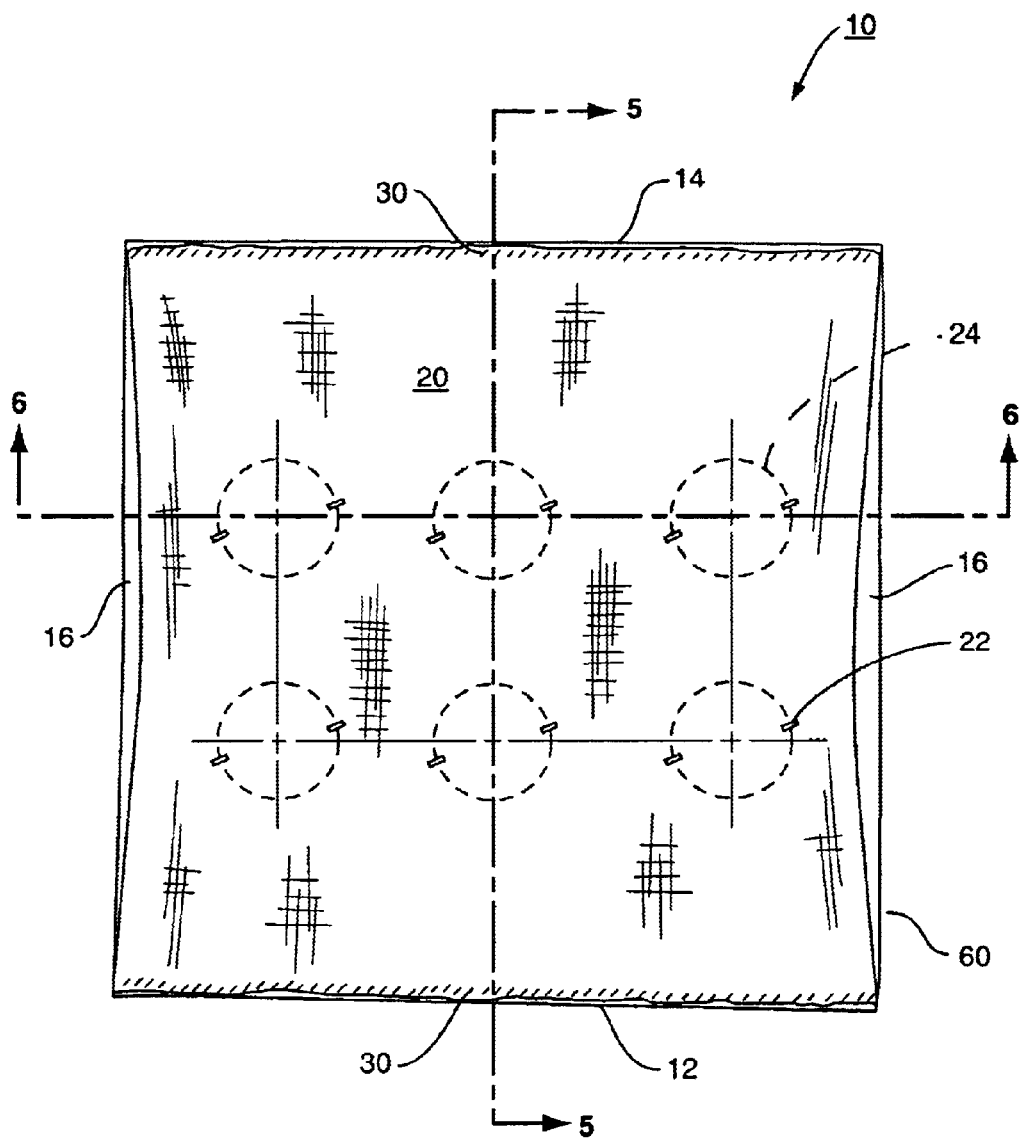
FIG. 3 is a top plan view of the spring support assembly shown in FIGS. 1 and 2.

As shown in FIGS. 1–3, the assembly 10 includes an outer frame 60 and an arrangement of springs 24. The outer frame 60 comprises a front panel 12, a back panel 14, and two opposed side panels 16. Preferably, frame panels 12, 14, and 16 are comprised of hardwood or the like. In a preferred arrangement, corner braces 32 are provided to reinforce the connection between the frame panels 12, 14, 16. As shown in FIGS. 2 and 3, a plurality of springs 24 are disposed inside frame 60. In the illustrated embodiment, six coil springs 24 are arranged in an array including three columns from front to back with two springs in each column. More or fewer springs may be provided in a distributed array within the frame depending on the length and width of the frame and the desired firmness of the spring support assembly. However, it is important to note that in an eight-way hand-tied system, there would probably be nine or more springs rather than the six shown in FIGS. 2 and 3 to provide an equivalent spring support. As seen best in FIGS. 2 and 4, the lower ends of springs 24 are supported by and secured within frame 60 by a lower spring support grid 36.

As illustrated in FIGS. 1 and 3, the open top of the frame 60 and top ends of springs 24 are covered by a top sheet 20. The top sheet 20 is constructed of a resilient, stretchable material. Preferably, the top sheet 20 comprises a commercially available elastic webbing material sold under the mark Ultra-Flex® by the Ultraflex Division of Foothills, Inc., a subsidiary of Hickory Springs Mfg. Co, Hickory, N.C. A preferred material has a stretch factor of about 100, i.e. a sheet of the material can be repeatably stretched to about twice its unstretched width, and substantially return to its original width in an unstretched state. The preferred material is woven and includes a plurality of elastic warp yarns comprising a resilient core wrapped by at least one substantially inelastic cover yarn. The elastic core may be either natural or synthetic rubber, and the wrap yarn may be cotton, nylon, polyester, or the like. The woven material also includes a plurality of substantially inelastic weft yarns which are nylon, polyester, or the like. A resilient outer coating such as latex covers the woven warp and weft yarns, and is at least partially impregnated therebetween. The sheet 20 is highly stretchable in a direction which is substantially parallel to the elastic warp yarns. Alternatively, the top sheet 20 may be constructed of other stretchable materials or fabrics having similar elastic properties.

Figure 5:
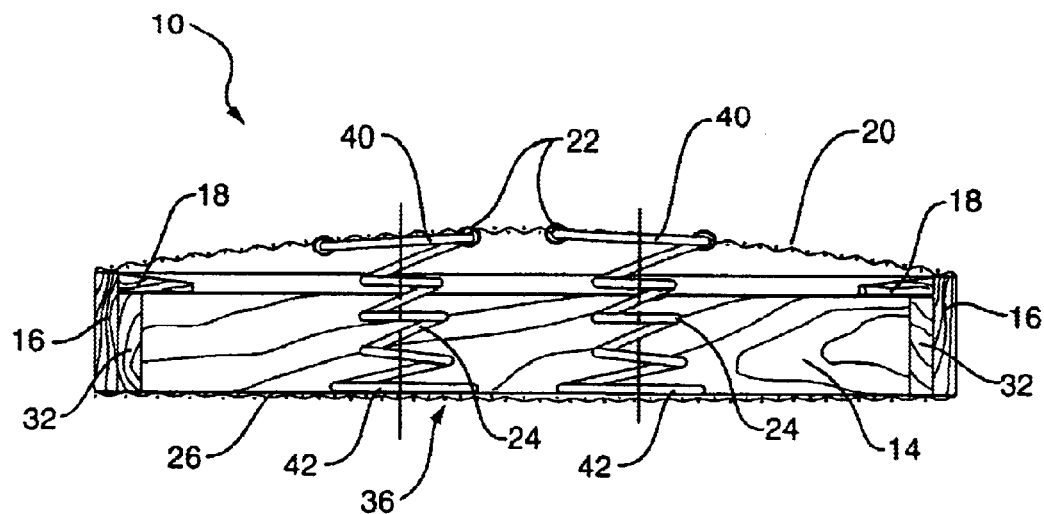
FIG. 5 is a cross-sectional elevation view of the spring support assembly of FIG. 3 taken along line 5—5.
Figure 6:
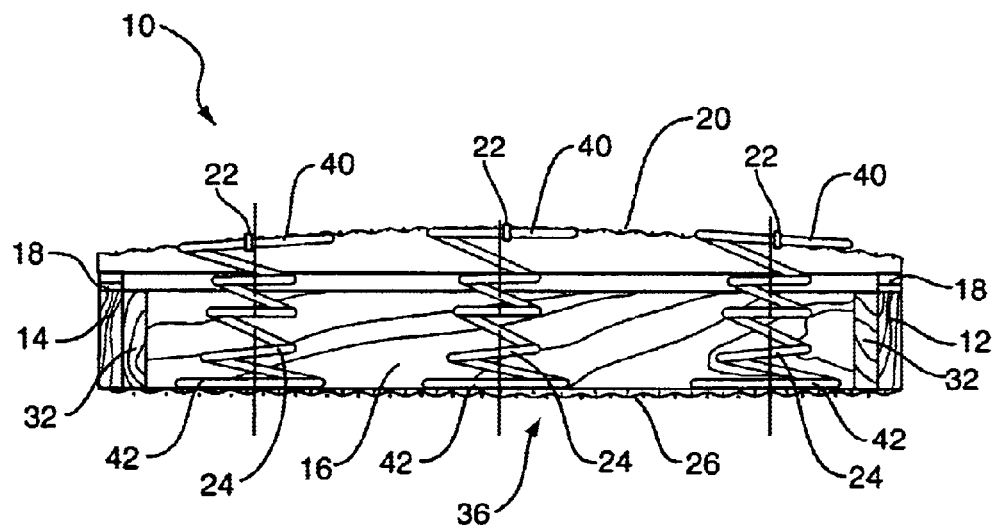
FIG. 6 is a cross-sectional elevation view of a spring support assembly of FIG. 3 taken along line 6—6.

As shown in FIGS. 1 and 3, the top sheet 20 is stretched over the top of frame 60 and the springs 24. Opposed edges of sheet 20 are affixed to top edges of front and rear panels 12, 14 by a plurality of staples 30 or other suitable fasteners. Preferably, top sheet 20 is sized and stretched over frame 60 so that its stretched length across the frame 60 is about 50% greater than its unstretched length. While 50% is preferred, a stretch in the range of about 30% to about 70% will maintain the springs in a preloaded condition. The height of springs 24 is selected such that the tautly stretched top sheet 20 partially compresses the springs 24 between the top sheet 20 and the lower spring support means 36, thereby preloading the springs 24. The springs 24 preferably are compressed between about 20% and about 40% of their uncompressed height by top sheet 20. As shown in FIGS. 1 and 3, clips 22 are used to attach the top ends of springs 24 to the overlying top sheet 20. Preferably, clips 22 are so-called "hog ring" fasteners. These fasteners extend through the top sheet 20 and are crimped around upper portions of the springs 24. Preferably, at least two clips 22 attach the top end of each spring 24 to top sheet 20. As illustrated in FIGS. 5 and 6, the top sheet 20 may form an arcuate surface over the tops of springs 24.

When the highly resilient top sheet 20 is pre-stretched over frame 60 and springs 24 in this way, the sheet provides a highly resilient support surface which compliments the resilient support of the underlying springs 24. Even without the underlying resilient support of springs 24, tautly stretched sheet 20 is capable of resiliently suspending a vertical load. The sheet 20 also provides a load communication path through which external loads on the spring suspension system 10 can be transmitted between the springs and the top sheet. The resilient support provided by top sheet 20 permits the spring support assembly 10 to include fewer springs than would be required to construct a comparable suspension apparatus without a resilient cover sheet.

As seen best in FIGS. 1 and 5, side panels 16 may be shorter in height than the front and rear panels 12, 14. This provides clearance for the side edges of top sheet 10 to deflect downward below the top edges of the front and rear panels 12, 14 when a load is applied atop the spring support system. Tapered blocks 18 may be provided atop the ends of sides 16 as shown to limit the downward deflection of the top sheet at the corners of the frame. By limiting the deflection of top sheet 20 in this way, blocks 18 help to prevent sheet 20 from tearing or pulling away at the corners.

Figure 4:
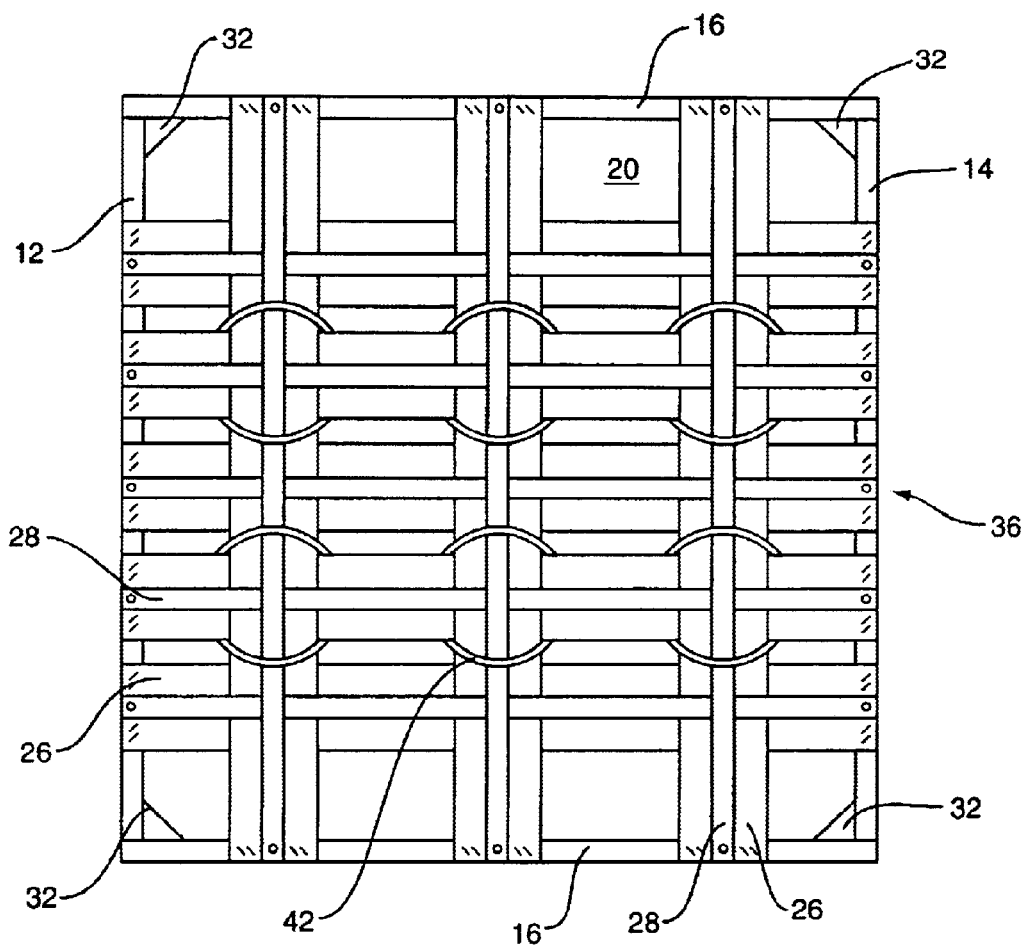
FIG. 4 is a bottom plan view of the spring support assembly shown in FIGS. 1–3.

In the embodiment illustrated in FIGS. 2 and 4, lower spring support means 36 includes a plurality of inelastic straps 26 in an interwoven lattice or grid arrangement across the open bottom of the frame. The straps 26 are tautly stretched between the front panel 12 and back panel 14 and between opposed side panels 16 as shown, and the ends of straps 26 are affixed to the frame panels. Preferably, straps 26 are constructed of a substantially inelastic woven fabric such as polypropylene or the like, and are affixed to the frame panels 12, 14, 16 with staples 30 or other suitable fasteners. In order to provide a more rigid and stable support for springs 26 and to limit any downward deflection of the straps 26, the straps 26 are reinforced by reinforcement bands 28. As shown in FIGS. 2 and 4, one or more reinforcement bands 28 may be placed beneath and along the straps 26. The ends of bands 28 can be affixed to frame panels 12, 14, 16 with suitable fasteners such as staples. Preferably, the bands 28 are constructed of metal such as steel. The lower spring support means is substantially coplanar with the bottom edges of frame 60. Depending on the amount of preload in springs 24, however, the lower spring support means 36 may protrude slightly below the bottom plane of the frame 60 as illustrated in FIGS. 5 and 6.

Figure 7:
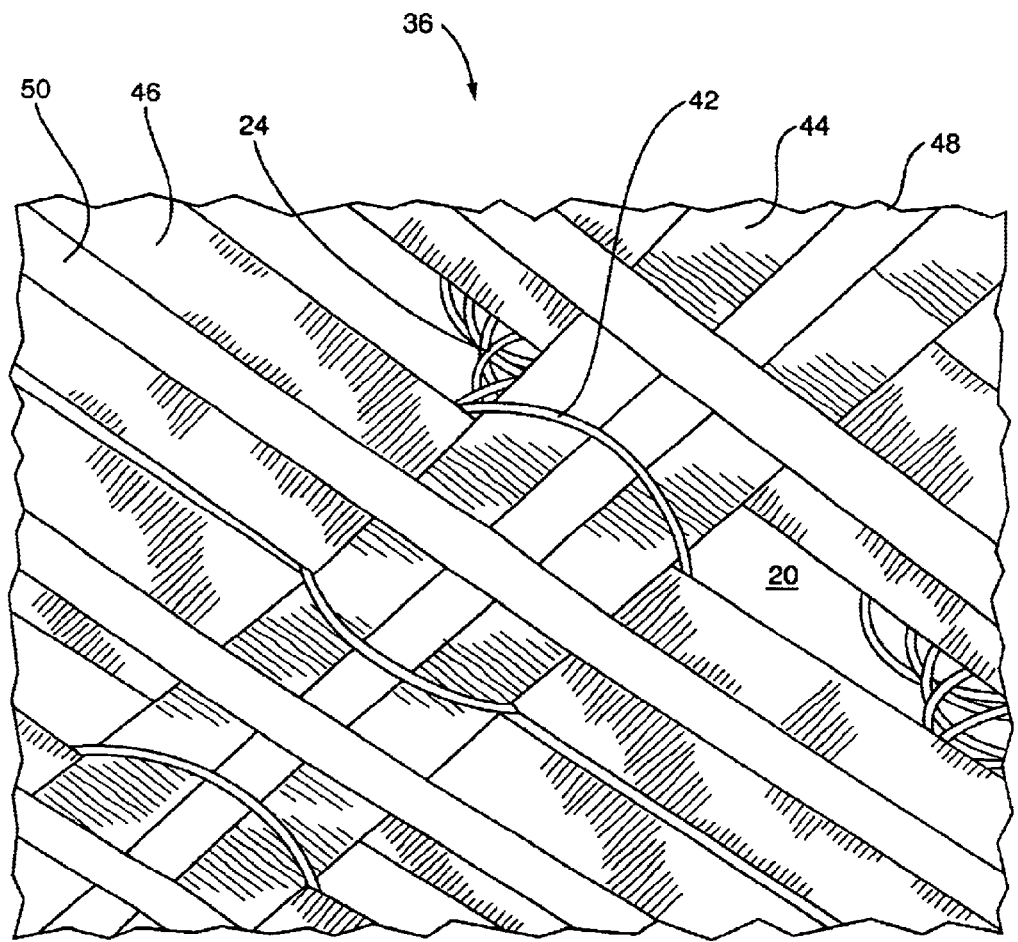
FIG. 7 is a detail perspective view of the lower spring support system shown in FIGS. 2 and 4.

FIG. 7 illustrates a preferred attachment means between the springs 24 and the lower spring support 36. In this arrangement, a spring 24 is positioned at a point of overlap between a first strap 44 and a second strap 46. First strap 44 passes over a bottom turn 42 of spring 24. Second strap 46 passes under bottom turn 42 and over first strap 44, thereby capturing bottom turn 42 between the straps. In this arrangement, no clips or fasteners are necessary to fix the lower end of spring 24 to the lower spring support means 36. First and second reinforcement bands 48 and 50 may be provided and interwoven as shown to provide additional support for spring 24.

Other types of lower spring support means 36 may be used without departing from the invention. For example, wires or a wire mesh may be used to span the bottom of frame 60 to affix and support the springs (not shown). Alternatively, rigid or semi-rigid members such as slats may be used across the bottom of the frame to support the bottoms of the springs (not shown).

Figure 8:
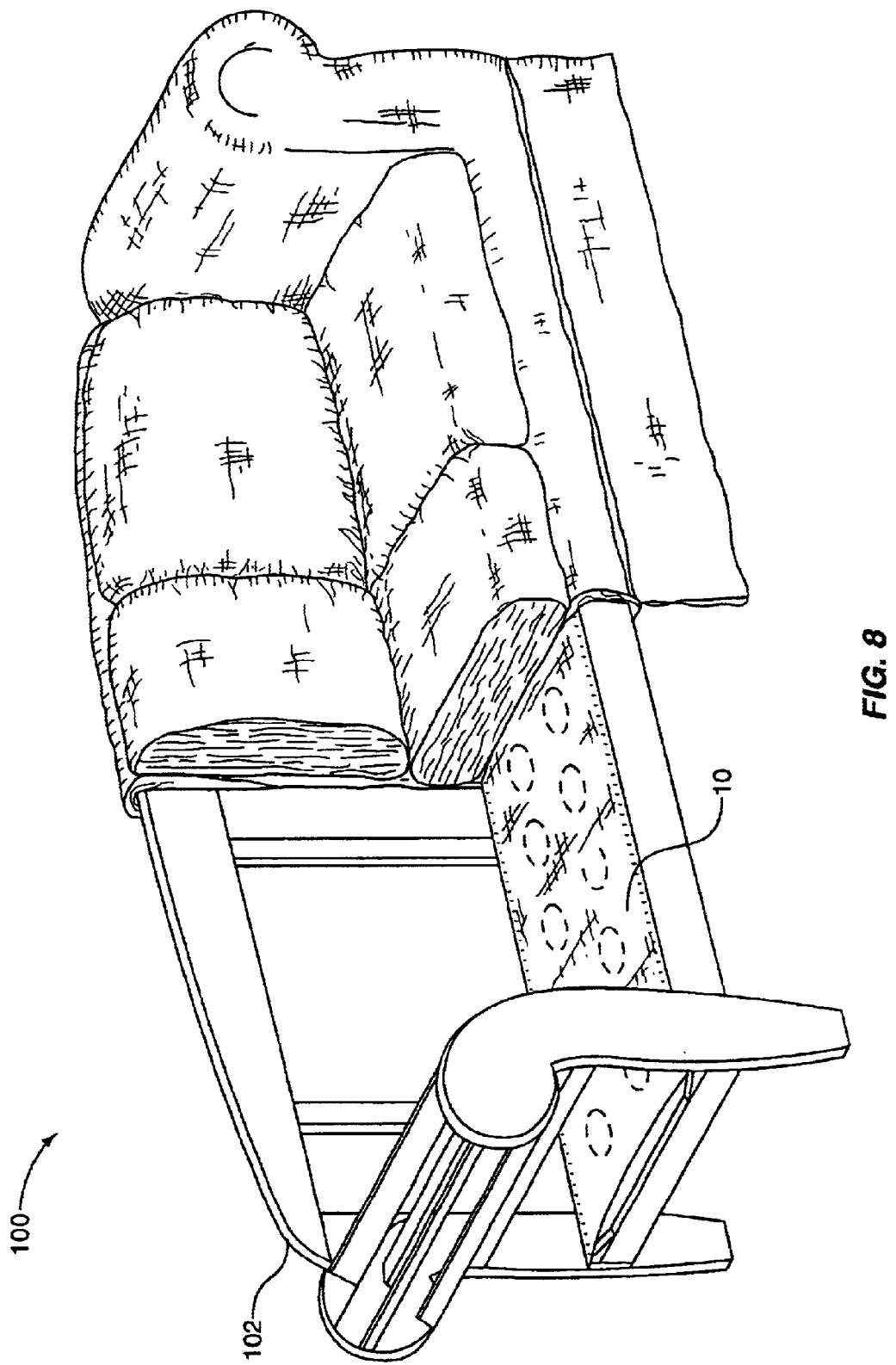
FIG. 8 is a perspective view of an upholstered seat having a frame with a spring support system according to the present invention.

In use, a spring support assembly 10 may be an integral portion of a frame 102 for a seat 100 as shown by way of example in FIG. 8. Alternatively, spring support assembly 10 may separate from the frame, and installed into a receiving portion of the frame (not shown). The invention may be incorporated into any article of furniture or the like for comfortably supporting a person in a seated, reclined, or partially reclined position The spring support assembly 10 provides an advantage over other known spring support systems which include springs having top ends which are interconnected by rows and columns of straps instead of a resilient top sheet. Unlike such straps, the resilient top sheet is connected to every spring in the assembly, and therefore provides a load path for transmitting loads among all of the springs in the assembly. Therefore a load on a particular spring may be at least partly shared with springs which are not in the same row or column as the loaded spring. This provides a more even distribution of loads among the springs, thereby providing a more responsive and comfortable spring support assembly. As discussed previously, because the sheet 20 is elastic, the number of springs can be reduced considerably. Further, the expensive hand-tying process is eliminated.

While this invention has been illustrated and described in accordance with a preferred embodiment, it is recognized that variations and changes may be made therein without departing from the invention as set forth in the claims. Certain modifications and improvements will occur to those skilled in the art upon a reading of the forgoing description. It should be understood that all such modifications are not contained herein for the sake of conciseness and readability, but are properly within the scope of the following claims.

What is claimed is:

1. An improved spring support assembly comprising:
    (a) an outer frame including an open bottom and open top, a front and a back, the front and back having opposed top edges;
    (b) a lower spring support grid affixed to the frame and spanning the open bottom;
    (c) at least two rows of vertically oriented springs having top ends and bottom ends, the bottom ends of the springs being affixed to the lower spring support grid; and
    (d) a top sheet having opposed margins, the margins being affixed to the opposed top edges of the outer frame such that the sheet is stretched between the top edges and over the open top of the frame and top ends of the springs, the top sheet being formed of an elastically stretchable material, whereby each of the springs is at least partially vertically compressed between the lower spring support grid and the top sheet;
    (e) wherein the top ends of the springs are affixed to the top sheet.

2. A spring support assembly according to claim 1 wherein the top sheet is stretchable from an unstretched length to a fully-stretched length, and wherein the fully-stretched length is at least twice as long as the unstretched length.

3. A spring support assembly according to claim 2 wherein the top sheet is affixed to the frame such that the top sheet is stretched to about fifty percent of its fully stretched width.

4. A spring support assembly according to claim 1 wherein the top sheet is woven and comprises:
    (a) a plurality of elastic warp yarns comprising an elastic core wrapped by at least one substantially inelastic cover yarn; and
    (b) a plurality of substantially inelastic weft yarns;
    wherein the top sheet is secured to and stretched across the frame in a direction which is substantially parallel to the elastic warp yarns.

5. A spring support system according to claim 4 wherein the top sheet further comprises a resilient coating substantially covering the woven warp and weft yarns and at least partially impregnated therebetween.

6. The spring support assembly according to claim 5 wherein the resilient coating comprises latex.

7. A spring support assembly according to claim 4 wherein the cores of the warp yarns are selected from the group consisting of synthetic rubber and natural rubber.

8. The spring support assembly according to claim 4 wherein the substantially inelastic weft yarns are selected from the group consisting of polypropylene and polyester.

9. A spring support apparatus according to claim 1 wherein the top end of each spring is affixed to the top sheet by at least one metal clip.

10. A spring support apparatus according to claim 1 wherein the partially compressed springs have a partially compressed spring height which is higher than the front and back panels of the frame, wherein the top sheet defines a substantially arcuate cover over the top ends of the springs.

11. A spring support assembly according to claim 1, wherein the outer frame comprises a portion of a seat frame.

12. A seat comprising a spring support assembly according to claim 1.

13. A box spring comprising a spring support assembly according to claim 1.

14. A seat comprising:
    (a) a frame portion comprising opposed front and rear panels and opposed end panels defining a frame interior, the front and rear panels having top and bottom edges and a first height, and the end panels having upper and lower edges and a second height, wherein the bottom edges and lower edges are substantially coplanar and define a bottom support plane;
    (b) a plurality of coil springs having top ends and bottom ends, the springs having an uncompressed spring height which is greater than the first height of the frame end panels, the springs being vertically oriented in at least two rows to form a spaced array of springs within the frame interior;
    (c) a lower spring support grid for laterally fixing and vertically supporting the bottom ends of the coil springs at points proximate the bottom support plane of the frame portion; and
    (d) a top sheet formed of knit or woven elastic yarns in at least the warp direction, the top sheet being elastically stretchable and having opposed edges, the opposed edges of the sheet being affixed to the top edges of the opposed front and rear panels such that the sheet is stretched between the top edges over the top ends of springs, whereby each of the springs is at least partially vertically compressed between the lower spring support grid and the top sheet;
    (e) wherein a top turn of each coil spring is affixed to the top sheet.

15. A seat according to claim 14 wherein the top turn of each spring is affixed to the top sheet by at least one metal clip.

16. A seat according to claim 14 wherein the top sheet is stretchable from an unstretched length to a fully-stretched length, and wherein the fully-stretched length is at least twice as long as the unstretched length.

17. A seat according to claim 14 wherein the top sheet is affixed to the frame such that the top sheet is stretched to about fifty percent of its fully stretched length.

18. A seat according to claim 14 wherein the top sheet is woven and comprises:
    (a) a plurality of elastic warp yarns comprising an elastic core wrapped by at least one substantially inelastic cover yarn; and
    (b) a plurality of substantially inelastic weft yarns;
    wherein the top sheet is secured and stretched across the frame in a direction which is substantially parallel to the elastic warp yarns.

19. A seat according to claim 18 further comprising a resilient coating substantially covering the woven warp and weft yarns and at least partially impregnated therebetween.

20. The spring support assembly according to claim 19 wherein the resilient coating comprises latex.

21. A spring support assembly according to claim 18 wherein the cores of the warp yarns are selected from the group consisting of synthetic and natural rubber.

22. The seat according to claim 18 wherein the substantially inelastic weft yarns are selected from the group consisting of nylon and polyester.

23. A seat according to claim 14 wherein at least portions of the end panels have a second height which is less than the first height of the front and rear panels.

24. A box spring comprising:
   (a) an outer frame having opposed top edges;
   (b) a plurality of vertically resilient spring members having top ends and having lower ends which are fixedly disposed within the outer frame in a plurality of rows and columns;
   (c) an elastically stretchable top sheet stretched between the opposed top edges of the frame and over the top ends of the vertically resilient members;
   (d) wherein the top end of each resilient spring member is attached to the top sheet, and wherein the elastic top sheet and vertically resilient spring members cooperate to provide a resilient support surface for supporting a person seated or reclined on the support surface.

* * * * *